(12) United States Patent
Yamasaku et al.

(10) Patent No.: US 8,786,912 B2
(45) Date of Patent: Jul. 22, 2014

(54) INFORMATION INPUT DEVICE

(71) Applicant: PFU Limited, Kahoku (JP)

(72) Inventors: Norihiro Yamasaku, Ishikawa (JP);
Motoharu Ichida, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/646,550

(22) Filed: Oct. 5, 2012

(65) Prior Publication Data
US 2013/0088759 A1   Apr. 11, 2013

(30) Foreign Application Priority Data

Oct. 7, 2011  (JP) .................. 2011-223143

(51) Int. Cl.
G06K 15/00 (2006.01)
G06F 3/12 (2006.01)
H04N 1/04 (2006.01)
H04N 1/10 (2006.01)
H04N 1/32 (2006.01)

(52) U.S. Cl.
CPC ......... H04N 1/1013 (2013.01); H04N 1/32138 (2013.01); H04N 1/1065 (2013.01)
USPC ......... 358/474; 358/1.14; 358/1.15; 358/1.16

(58) Field of Classification Search
CPC ...................................... H04N 1/04
USPC ............. 358/474, 1.14, 468, 1.15, 1.16, 505, 358/482, 508, 513, 436, 476, 443; 455/557, 455/344, 558, 550.1, 556.1, 121, 141.2, 455/161.3, 189.2, 182.1, 188.2, 274, 285, 455/292; 292/703, 728, 732, 734, 748, 757, 292/761, 764, 842, 855, 895
See application file for complete search history.

(56) References Cited

U.S. PATENT DOCUMENTS

| 2002/0183094 | A1* | 12/2002 | Seita ............................. 455/558 |
| 2005/0006473 | A1* | 1/2005 | Deguchi et al. ............... 235/451 |
| 2007/0159333 | A1* | 7/2007 | Deguchi ..................... 340/572.7 |
| 2008/0062451 | A1* | 3/2008 | Yamazaki .................... 358/1.14 |
| 2008/0261653 | A1* | 10/2008 | Hara et al. ..................... 455/557 |
| 2009/0146898 | A1* | 6/2009 | Akiho et al. .................. 343/787 |

FOREIGN PATENT DOCUMENTS

| JP | 2006-134054 A | 5/2006 |
| JP | 2006-203630 A | 8/2006 |

* cited by examiner

Primary Examiner — Ngon Nguyen
(74) Attorney, Agent, or Firm — McDermott Will & Emery LLP

(57) ABSTRACT

There is provided an information input device including: a chassis made of a non-metallic material; an antenna mounted to an upper portion of the chassis; and a fluctuation easing member which is mounted to a lower portion of the chassis to ease fluctuations in magnetic field intensity caused by a surface on which the information input device is mounted.

8 Claims, 4 Drawing Sheets

INFORMATION INPUT DEVICE

CROSS-REFERENCE TO RELATED APPLICATIONS

This application is based on and claims priority under 35 USC 119 from Japanese Patent Application No. 2011-223143 filed Oct. 7, 2011.

FIELD

The present invention relates to an information input device.

BACKGROUND

For example, JP2006-134054(A1) discloses an IC card reader/writer that includes an image reading section which optically reads an image on the ticket surface of a non-contact type IC card.

Further, JP2006-203630(A1) discloses an image reading device including: a manuscript table on which a manuscript is placed; a manuscript scanning section that moves a manuscript placed on the manuscript table in a sub-scanning direction to scan it optically; and an image reading section that optically reads an image of the scanned manuscript and converts it into electronic data, the image reading device including a section that includes, on the manuscript scanning section, at least one communication antenna which communicates with a wireless communication element including a memory and an antenna, thereby reading information from and writing it to the memory in the wireless communication element via the communication antenna.

SUMMARY

According to an aspect of the invention, there is provided an information input device including: a chassis made of a non-metallic material; an antenna mounted to an upper portion of the chassis; and a fluctuation easing member which is mounted to a lower portion of the chassis to ease fluctuations in magnetic field intensity caused by a surface on which the information input device is mounted.

BRIEF DESCRIPTION OF DRAWINGS

Exemplary embodiments of the present invention will be described in detail based on the following figures, wherein.

DESCRIPTION OF EMBODIMENT

Figure 1:
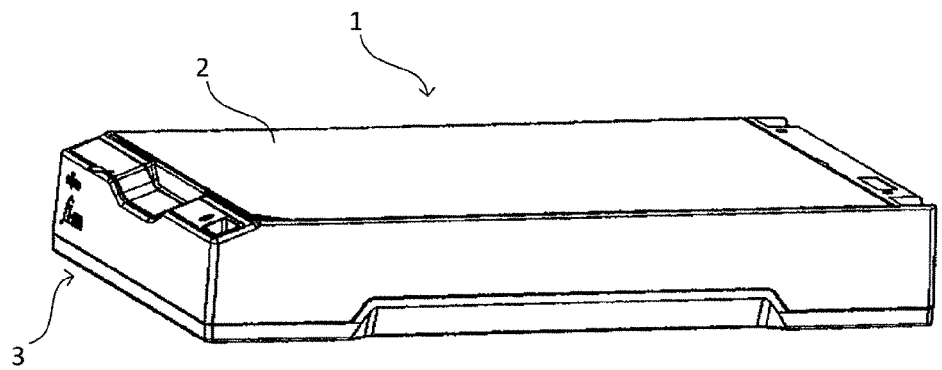
FIG. 1 is a perspective view of an information input device 1 according to the embodiment.

First a description will be given of a background and an outline of the present embodiment.

Typical non-contact type IC scanners perform communication by utilizing electromagnetic induction based on a magnetic field between an antenna and an IC chip. Accordingly, an intensity of the magnetic field is liable to fluctuate during communication, depending on an installation environment; further, if there is a metallic member between the antenna and the IC chip or in their periphery, an eddy current flows through the metallic member in the periphery owing to an influence from the magnetic field, thereby giving rise to a diamagnetic field. Therefore, the magnetic field which is fundamentally required for communication is weakened to reduce a communication distance, providing an obstacle to reading.

The information input device 1 according to the embodiment has a function to acquire information from an IC chip attached to a manuscript by utilizing electromagnetic induction and a function to read an image from the manuscript optically. Further, the information input device 1 is a handy device having a size of a depth of not more than 30 cm, a width of not more than 30 cm, and a height of not more than 30 cm (preferably, not more than 5 cm). The information input device 1 of the embodiment can easily be carried about to anywhere and does not need a large space to mount through miniaturization, thereby realizing convenience.

However, the magnetic field intensity fluctuates with the installation environment and the material of the installation surface, so that it is not necessarily possible to maintain magnetic field intensity required for communication at every installation site. In particular, the information input device 1 of the embodiment has its height set not more than 30 cm and suffers from a small distance between the IC chip reading face and the installation surface, being liable to be affected by fluctuations in magnetic field owing to the installation surface.

Further, the antenna provided in the information input device 1 of the embodiment has a shape of a loop including a region not smaller than the A6 size. The magnetic field intensity around the center of the reading region of the loop antenna tends to be weaker than that around it. Therefore, as a reading face is relatively larger, it is more difficult maintain the magnetic field intensity near the center of the reading region of the loop antenna. Conversely, increasing the magnetic field intensity unnecessarily can possibly destroy the IC chip.

To solve the problems, the information input device 1 according to the embodiment includes a fluctuation suppression member to suppress fluctuations in magnetic field intensity caused by the installation surface to set the antenna output intensity, taking into account an influence from the magnetic field intensity owing to the fluctuation suppression member.

The following will describe an exterior configuration of the present embodiment of the invention with reference to the drawings. However, the scope of the present invention is not limited to illustrated examples.

FIG. 1 is a perspective view of the information input device 1 according to the embodiment.

Figure 2:
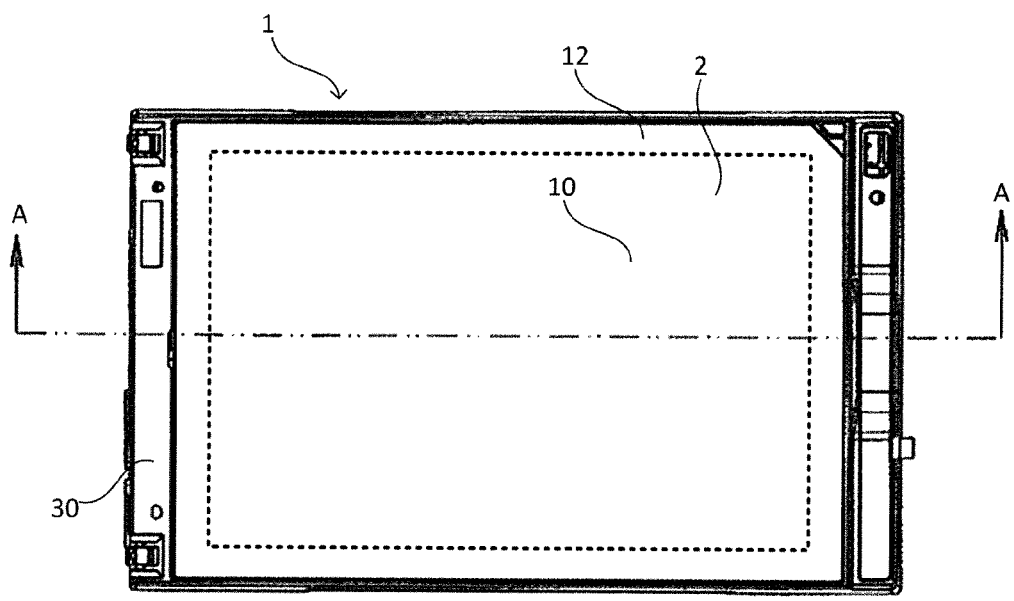
FIG. 2 is a plan view of the information input device 1 according to the embodiment shown in FIG. 1.

FIG. 2 is a plan view of the information input device 1 according to the embodiment shown in FIG. 1.

As illustrated in FIGS. 1 and 2, the information input device 1 includes a glass plate 2 on which a manuscript can be placed and a chassis 3 which houses mechanical portions. The chassis 3 can include a manuscript table cover (not shown) which can fix a manuscript placed.

The glass plate 2 is a square, transparent sheet-shaped member. The glass plate 2 in this example is made of glass but may be made of any other materials as long as they have magnetic permeability, for example, transparent plastic.

The glass plate 2 has an antenna 20, an antenna affixing region 12, and a reading face 10 on its surface. To the antenna affixing region 12, the antenna 20 is affixed. The reading face 10 is a region surrounded by the antenna 20 and functions as a manuscript table.

The antenna 20 is loop-shaped and made of a material through which an electric current can flow. To scan the non-contact type IC chip attached to a manuscript, the antenna 20 generates a magnetic field corresponding to the non-contact type IC chip to give rise to electromotive force in it in order to perform communication. The antenna 20 in this example is fixed to a side of the glass plate 2 that faces the chassis 3 and disposed to form a loop along an edge of the glass plate 2.

An output of the antenna 20 is set taking into account an influence from a bottom surface steel plate 50 to be described later. Specifically, the output intensity of the antenna 20 is set to a level so that IC information can be read from the disposed IC chip no matter whether there is a static influence from the bottom surface steel plate 50 and no matter where on the reading face 10 the IC chip is disposed.

The antenna affixing region 12 is on the glass plate 2 to which the loop-shaped antenna 20 is affixed. The antenna affixing region 12 is also a region where the placed manuscript cannot be scanned optically.

The reading face 10 is surrounded by the antenna affixing region 12. Through the reading face 10, an inside of the chassis 3 can be seen in order to optically scan the placed manuscript. On the reading face 10, a manuscript whose image is to be read or a medium (which is also hereinafter referred to as a manuscript) to which the non-contact type IC chip is attached is to be placed. The reading face 10 is set to the A6 size (105 mm by 148 mm) or a size that can contain one side of a passport.

Figure 3:
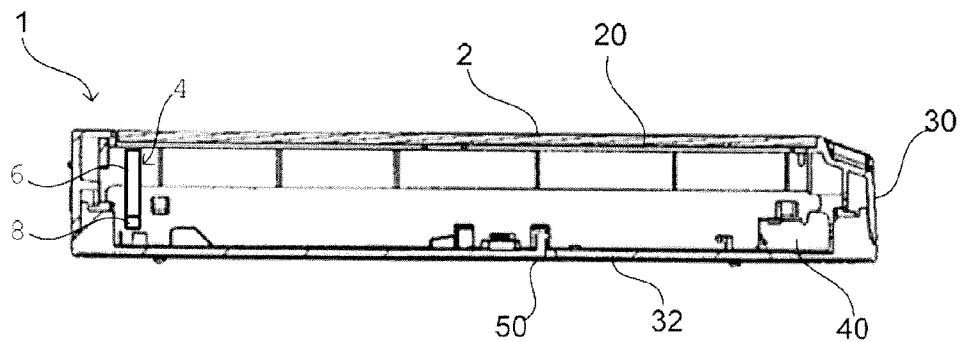
FIG. 3 is a cross-sectional view taken along line A-A of FIG. 2.

FIG. 3 is a cross-sectional view taken along line A-A of FIG. 2.

Figure 4:
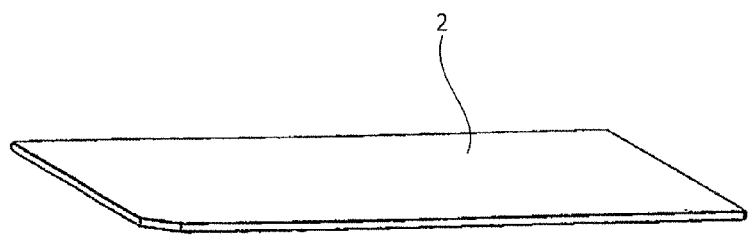
FIG. 4 is a perspective view illustrating a glass plate 2.

FIG. 4 is a perspective view illustrating the glass plate 2.

Figure 5:
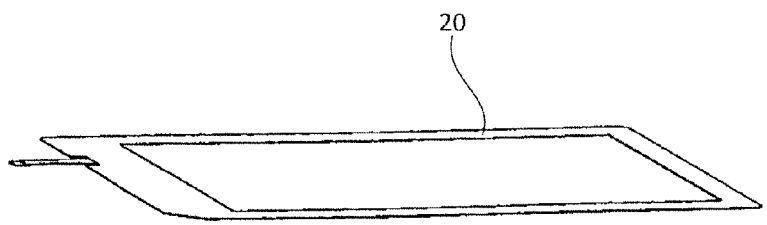
FIG. 5 is a perspective view illustrating an antenna 20.

FIG. 5 is a perspective view illustrating the antenna 20.

Figure 6:
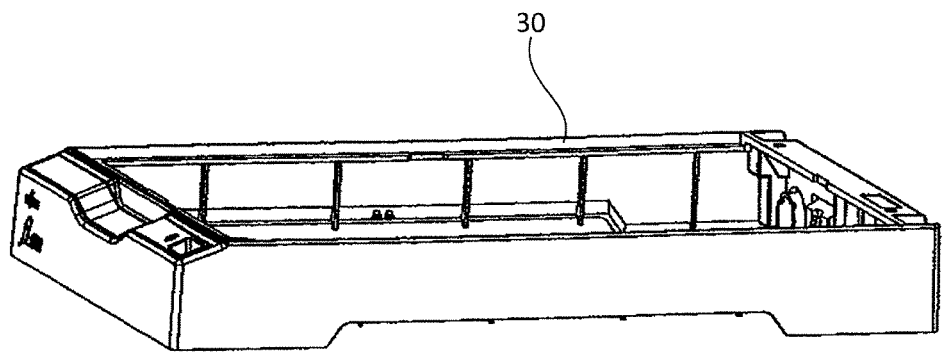
FIG. 6 is a perspective view illustrating a top cover 30.

FIG. 6 is a perspective view illustrating a top cover 30.

Figure 7:
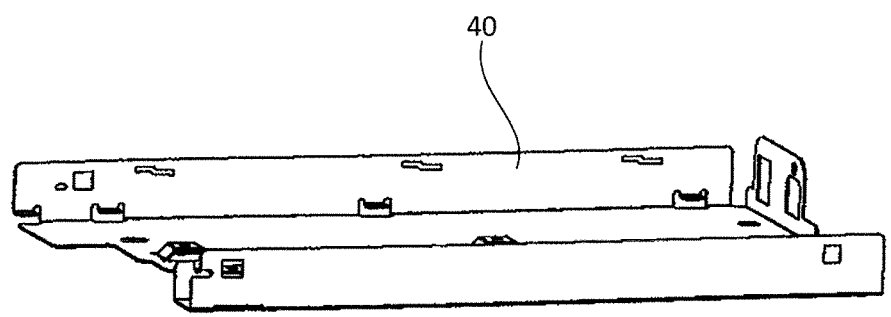
FIG. 7 is a perspective view illustrating a shield steel plate 40.

FIG. 7 is a perspective view illustrating a shield steel plate 40.

Figure 8:
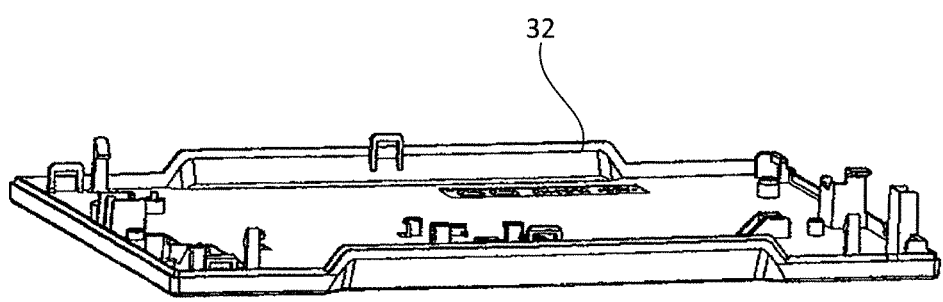
FIG. 8 is a perspective view illustrating a base frame 32.

FIG. 8 is a perspective view illustrating a base frame 32.

Figure 9:
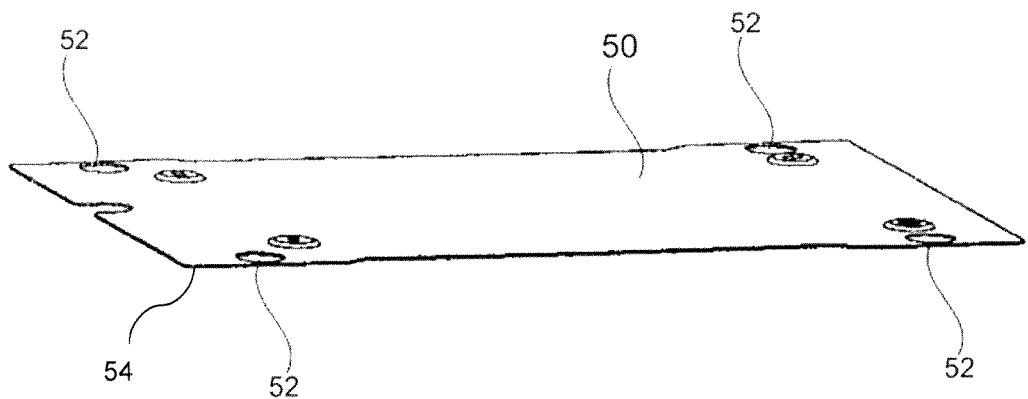
FIG. 9 is a perspective view illustrating a bottom surface steel plate 50.

FIG. 9 is a perspective view illustrating a bottom surface steel plate 50.

As shown in FIGS. 3 to 9, the chassis 3 includes the top cover 30 constituting its side surface and the base frame 32 constituting its bottom surface. The shield steel plate 40 is disposed inside the chassis 3, and the bottom surface steel plate 50 is disposed on the bottom surface of the chassis 3.

As illustrated in FIG. 6, the top cover 30 is side surface armor of the chassis 3 of the information input device 1. The top cover 30 is made of a non-metallic material, for example, synthetic resin. The top cover 30 is shaped like a rectangular solid and has a large opening in its upper surface portion and lower surface portion. Further, the top cover 30 has a recess used to lift the manuscript table cover and has a power supply button disposed near it configured to actuate the information input device 1.

The shield steel plate 40 is an interior framework of the information input device 1 as illustrated in FIG. 7. The shield steel plate 40 is made of metal, for example, stainless, aluminum, copper, or iron. The shield steel plate 40 has a roughly quadrangular shape of a size which can be contained under the top cover 30, and has its end erected almost vertically so that it can be fixed.

The shield steel plate 40 is positioned apart from the antenna 20 by not less than 10 mm to shield electromagnetic waves generated by a control device (not shown).

The base frame 32 is bottom surface armor of the chassis 3 of the information input device 1 as illustrated in FIG. 8. The base frame 32 is made of a non-metallic material, for example, synthesis resin. The base frame 32 is quadrangular and has a size that matches the top cover 30. The base frame 32 has a constriction to hold the information input device 1 at each end in the sub-scanning direction so that it can be carried about easily.

The bottom surface steel plate 50 is a sheet-shaped metal member as illustrated in FIG. 9 and made of, for example, stainless, aluminum, copper, or iron. The bottom surface steel plate 50 is one example of a fluctuation easing member according to the invention.

The bottom surface steel plate 50 has a function to prevent the information input device 1 from being influenced by an environment in which it is installed.

The bottom surface steel plate 50 in this example is a roughly quadrangular plate having a larger area than an outer circumference of the antenna 20. Further, the bottom surface steel plate 50 in this example has an attachment hole 52 for fixation and a projection 54 configured to maintain some distance from the base frame 32 at each of its four corners. The attachment hole 52 formed in the bottom surface steel plate 50 has a diameter of not more than 13 mm. Further, when the information input device 1 is viewed from perpendicularly above, the attachment hole formed in the bottom surface steel plate 50 is disposed more outside than the antenna 20. Besides the attachment hole 52, the bottom surface steel plate 50 can include an additional hole (not shown) formed in it. However, it is preferable that the additional hole has a diameter of not more than 13 mm and is disposed more outside than the antenna 20. Further, the bottom surface steel plate 50 is positioned apart from the antenna 20 by at least 10 mm.

Further, the chassis 3 is provided with a movable unit 4 for reading an image from the manuscript. An upper portion of the movable unit (that is, its portion close to the glass plate 2) is provided with a light guiding body 6 formed of a non-metallic member and a lower portion of this unit (i.e. its portion far away from the glass plate 2) is provided with a light receiving element 8 including a metallic portion. The light receiving elements are arranged in a longer direction (main scanning direction) of the movable unit to form a linear image sensor.

In image reading, the movable unit moves in the sub-scanning direction below the glass plate 2 in the vicinity of this glass plate 2, thereby picking up light guided by the light guiding body and reflected by the manuscript by using the light receiving elements.

Further, the chassis 3 houses an IC information acquisition section, a control device, and a power supply section. The IC information acquisition section reads IC information from the IC chip via the antenna 20. The control device controls the IC information acquisition section and the movable unit. The power supply section supplies power in other components such as the antenna 20, the movable unit, and the IC information acquisition section.

As described hereinabove, the information input device 1 can stably read IC information from the IC chip attached to a manuscript placed on the reading face 10 no matter where it is installed.

Next, a description will be given of a modification of the above embodiment.

Figure 10:
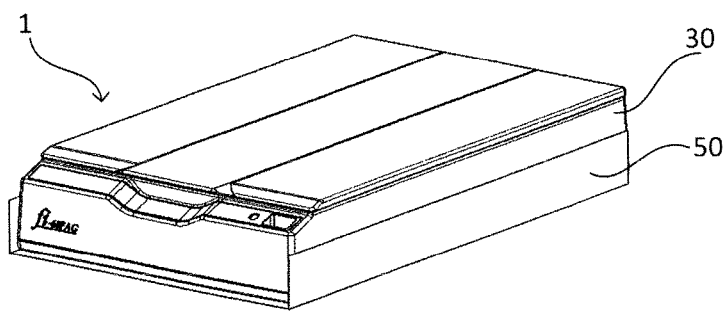
FIG. 10 is a perspective view that is obliquely looked-down, illustrating a modification of the information input device 1 according to the embodiment.
Figure 11:
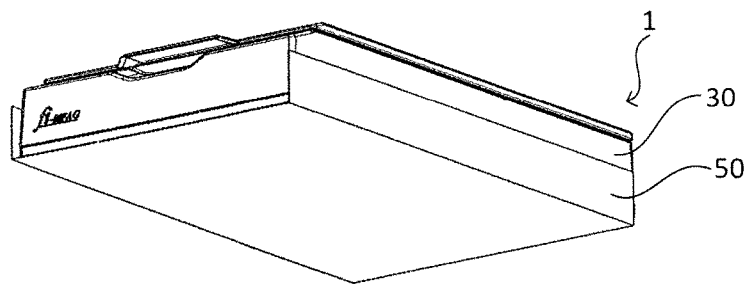
FIG. 11 is perspective view obliquely looked-up, illustrating the modification of the information input device 1 according to the embodiment.

Although in the above embodiment, the bottom surface steel plate 50 has been described to be roughly quadrangular and have a size that matches the base frame 32, the invention is not limited to it. For example, the bottom surface steel plate 50 may cover the device up to the top cover 30 as illustrated in FIGS. 10 and 11. However, the erected end surface of the bottom surface steel plate 50 is apart from the antenna 20 by at least about 10 mm.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information input device comprising:
   a chassis made of a non-metallic material having a depth of not more than 30 cm and a width of not more than 30 cm;
   an antenna mounted to an upper portion of the chassis;
   a fluctuation easing member which is mounted to a lower portion of the chassis to ease fluctuations in magnetic field intensity caused by a surface on which the information input device is mounted; and
   a reading face which is mounted to the upper portion of the chassis to scan an IC chip, wherein
   the antenna is disposed around the reading face to scan the IC chip mounted on the reading face and output intensity of the antenna is set to a level so that IC information is readable from the disposed IC chip no matter where on the reading face the IC chip is disposed,
   the fluctuation easing member is disposed on a bottom surface of the chassis and has a projection area larger than the antenna when looked from vertically above,
   the reading face is formed of a transparent sheet-shaped member and includes a region not smaller than the A6 size,
   the information input device further comprises:
      an image reading section which moves in a sub-scanning direction to optically scan a manuscript placed on the reading face; and
      an information acquisition section which wirelessly acquires information via the antenna from the IC chip attached to the manuscript placed on the reading face,
   the image reading section includes a light guiding member containing a non-metallic member and a light receiving element containing a metallic member,
   the light guiding member of the image reading section is disposed at a position close to the reading face, and
   the light receiving element of the image reading section is disposed at a position apart from the antenna by at least 10 mm.

2. The information input device according to claim 1, wherein the fluctuation easing member is formed of a metallic member larger than an outer circumference of the antenna.

3. The information input device according to claim 1, wherein the fluctuation easing member is a metallic sheet having an opening with a diameter of not more than 13 mm.

4. The information input device according to claim 3, wherein the opening formed in the metallic sheet is positioned more outside than the antenna in plan view.

5. The information input device according to claim 1, wherein the fluctuation easing member is apart from the antenna by at least 10 mm.

6. The information input device according to claim 5, wherein the fluctuation easing member is a metallic member which covers a portion of the bottom surface and a side surface of the chassis.

7. The information input device according to claim 1, wherein the information acquisition section performs wireless communication via the antenna only when the image reading section is present at a predetermined position.

8. The information input device according to claim 1, further comprising a control section which controls the image reading section and the information acquisition section, wherein
   the control section executes control so that image reading processing by the image reading section and information acquisition processing by the information acquisition section are performed continually on the same manuscript.

* * * * *